United States Patent
Yamada

(10) Patent No.: US 7,719,745 B2
(45) Date of Patent: May 18, 2010

(54) DISPLAY DEVICE AND ELECTRONIC APPARATUS

(75) Inventor: Tadashi Yamada, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 142 days.

(21) Appl. No.: 12/168,509

(22) Filed: Jul. 7, 2008

(65) Prior Publication Data

US 2009/0015901 A1 Jan. 15, 2009

(30) Foreign Application Priority Data

Jul. 10, 2007 (JP) ............................. 2007-180535
Jul. 10, 2007 (JP) ............................. 2007-180537
Oct. 22, 2007 (JP) ............................. 2007-273470

(51) Int. Cl.
*G02F 1/03* (2006.01)
*G02F 1/29* (2006.01)

(52) U.S. Cl. .................. 359/245; 359/259; 359/315; 359/316; 359/318; 349/106; 349/137; 349/138; 349/156; 353/84; 257/59

(58) Field of Classification Search .................. 359/237, 359/238, 245, 259, 315, 316, 318; 349/42, 349/44, 86, 93, 106, 111, 113, 137, 138, 349/156; 257/59, 72, 88, 200, 202; 156/102, 156/109, 382; 430/22; 438/30, 57, 458
See application file for complete search history.

(56) References Cited

U.S. PATENT DOCUMENTS

| 5,789,761 | A | * | 8/1998 | Ihara et al. | 257/59 |
| 5,956,112 | A | * | 9/1999 | Fujimori et al. | 349/156 |
| 5,978,056 | A | * | 11/1999 | Shintani et al. | 349/137 |
| 6,433,913 | B1 | * | 8/2002 | Bauer et al. | 359/265 |
| 6,982,181 | B2 | * | 1/2006 | Hideo | 438/30 |
| 7,172,294 | B2 | * | 2/2007 | Yano et al. | 353/84 |

FOREIGN PATENT DOCUMENTS

| JP | A-08-321381 | 12/1996 |
| JP | A-09-127885 | 5/1997 |

* cited by examiner

*Primary Examiner*—Loha Ben
(74) *Attorney, Agent, or Firm*—Oliff & Berridge PLC

(57) ABSTRACT

A display device includes the following elements. A display has a display area and includes an electro-optic layer and a light-reflecting layer reflecting light emitted from the electro-optic layer to the viewing side of the display device, the light-reflecting layer being arranged in the display area. A plate-shaped exterior has a frame area including a portion located outside the periphery of the display. An antireflective plate continuously covers both of the display area and the frame area. The antireflective plate prevents external light, which enters the viewing side of the display device and is reflected by the light-reflecting layer or the frame area, from emerging on the viewing side.

13 Claims, 12 Drawing Sheets

DISPLAY DEVICE AND ELECTRONIC APPARATUS

BACKGROUND

1. Technical Field

The present invention relates to a technique for displaying an image using an electro-optic layer, such as a luminous layer or a liquid crystal layer.

2. Related Art

A display, in which light reflected by a reflecting layer disposed on the rear surface of an electro-optic layer is allowed to emerge on the front (viewing) side of the display and is used for display, has disadvantages in that external light incident on the viewing side of the display is reflected toward the viewing side by the reflecting layer and a view in front of the display is superimposed on an image originally displayed on the display, i.e., the view in front of the display is reflected in the displayed image. Japanese Unexamined Patent Application Publication Nos. 8-321381 and 9-127885 disclose techniques for preventing a reflection of a view in front of a display using a circular polarizer arranged adjacent to the viewing side of the display above an electro-optic layer.

SUMMARY

Displays are required to have a larger screen. To realize a large-sized display, it is necessary to overcome various problems, e.g., an increase in manufacturing cost, a reduction in yield, an increase in size of a drive circuit, and an increase in power consumption. An advantage of some aspects of the invention is to increase the apparent area of a display area without increasing the size of a display.

According to a first aspect of the present invention, a display device includes the following elements. A display has a display area and includes an electro-optic layer and a light-reflecting layer that reflects light emitted from the electro-optic layer to the viewing side of the display device, the light-reflecting layer being arranged in the display area. A plate-shaped exterior has a frame area including a portion located outside the periphery of the display. An antireflective plate continuously covers both of the display area and the frame area and prevents external light, which enters the viewing side of the display device and is reflected by the light-reflecting layer or the frame area, from emerging on the viewing side. With this arrangement, since the antireflective plate continuously covers the display area and the frame area, the border between the display and the exterior is obscured. Therefore, the apparent area of the display area can be increased without increasing the size of the display. The display device according to this aspect of the present invention is applicable to various electronic apparatuses.

In the display device according to the first aspect, preferably, the optical characteristics of the frame area of the exterior substantially (nearly) match those of the display area of the display (when all pixels are turned off). More specifically, preferably, a maximum vale of the difference (e.g., a difference $\Delta$ in FIG. 4) between a reflectance (%) measured by applying measurement light having a predetermined wavelength to the frame area of the exterior through the antireflective plate and that measured by applying measurement light having the same predetermined wavelength to the display area of the display through the antireflective plate is 3% or less when the wavelength of the measurement light ranges from 500 nm to 600 nm. In this case, the border between the display and the exterior can be particularly obscured.

In the display device according to the first aspect, the exterior may be a frame-shaped member that has an opening formed so that the display area of the display is located within the inner periphery of the exterior. Furthermore, it is preferable that the display include a light-shielding layer shielding a region between pixels against light and the outer periphery of the light-shielding layer be located outside the inner periphery of the exterior. In this case, since the outer periphery of the light-shielding layer is located outside the inner periphery of the exterior, the border between the display and the exterior can be obscured more than an arrangement in which there is a space (e.g., an area GB in FIG. 5) between the inner periphery of the exterior and the outer periphery of the light-shielding layer.

In the display device according to the first aspect, preferably, the exterior is joined to a first surface of the display adjacent to the viewing side of the display device, and the antireflective plate is joined to a first surface of the exterior adjacent to the viewing side. In this case, since the antireflective plate is positioned at a distance from the first surface of the display, the transfer of heat from the display to the antireflective plate can be prevented. Accordingly, the antireflective plate can be prevented from being deteriorated by heating. In this arrangement where the antireflective plate is positioned at a distance from the first surface of the display, light is reflected by the first surface of the display and is reflected by a second surface of the antireflective plate remote from the viewing side. Therefore, it is preferable that the display device further include an antireflection (AR) coating layer disposed on at least one of the second surface of the antireflective plate opposed to the display and the first surface of the display opposed to the antireflective plate. Alternatively, the display device may further include a light-transmissive filler disposed in a space between the first surface of the display and the second surface of the antireflective plate. In each of the above-described arrangements, advantageously, the reflection of light by the first surface of the display and that by the second surface of the antireflective plate can be prevented.

In the display device according to the first aspect, the exterior may be a plate-shaped member disposed on a second surface of the display remote from the viewing side. In this case, advantageously, the exterior can be easily joined to the display and the mechanical strength of the display can be enhanced by the exterior.

In the display device according to the first aspect, preferably, the second surface of the antireflective plate opposed to the display is covered with a light-shielding characteristic control layer (e.g., a characteristic control layer 80 shown in FIG. 13 or 14) such that the characteristic control layer is partially located outside the display area. In this case, even when the optical characteristics of the frame area of the exterior differ from those of the display area of the display, the optical characteristics of the characteristic control layer is allowed to match those of the display area of the display, so that the periphery of the display (i.e., the border between the display area and the characteristic control layer) can be obscured. The characteristic control layer may include a first sublayer disposed on the second surface of the antireflective plate and a second sublayer disposed on the first sublayer, the second sublayer having a plurality of openings. In this case, the optical characteristics of the characteristic control layer can be adjusted by appropriately choosing the shape and distribution (the total number or density) of the openings in the second sublayer. When one of the first and second sublayers is formed so as to sufficiently transmit light coming from the display, the sublayer may be arranged on the second surface of the antireflective plate outside and inside the display area (i.e., over the whole of the second surface of the antireflective plate opposed to the display).

According to a second aspect of the present invention, a display device includes the following elements. A plurality of displays each have a display area and include an electro-optic layer and a light-reflecting layer that reflects light emitted from the electro-optic layer to the viewing side of the display device, the light-reflecting layer being arranged in the display area of each display. A plate-shaped exterior has a frame area including a portion (e.g., a portion A2a in FIG. 8 or a portion A2b in FIG. 9) located outside the periphery of each display. An antireflective plate continuously covers the display areas of the respective displays and the frame area. The antireflective plate prevents external light, which enters the viewing side of the display device and is reflected by the light-reflecting layer of each display or the frame area, from emerging on the viewing side. In this arrangement, since the antireflective plate continuously covers the display areas and the frame area, the border between each display and the exterior is not obscured. Advantageously, the apparent area of each display area can be increased without increasing the size of each display. The display device according to the second aspect of the present invention is applicable to various electronic apparatuses.

In the display device according to the second aspect, preferably, the displays are spaced apart from each other, and the exterior includes a portion (e.g., the portion A2b in FIG. 9) between the adjacent displays. In this case, the displays are spaced apart from each other while the border between the exterior and each of the adjacent displays is obscured, so that the apparent area of the display areas can be further increased.

In the display device according to the second aspect, preferably, a maximum value of the difference (e.g., the difference Δ in FIG. 4) between a reflectance (%) measured by applying measurement light having a predetermined wavelength to the frame area of the exterior through the antireflective plate and that measured by applying measurement light having the same predetermined wavelength to the display area of each display is 3% or less when the wavelength of the measurement light ranges from 500 nm to 600 nm. In this case, the border between each display and the exterior can be particularly obscured.

In the display device according to the second aspect, the exterior may be a plate having a plurality of openings formed so that the display area of each display is located within each opening (i.e., each inner periphery of the exterior). Each display may further include a light-shielding layer that shields a region between pixels against light, the light-shielding layer being formed such that the outer periphery of the light-shielding layer is located outside the corresponding inner periphery of the exterior. In this case, since the outer periphery of the light-shielding layer in each display is located outside the corresponding inner periphery of the exterior, the border between each display and the exterior can be obscured more than the arrangement in which there is a space (e.g., the area GB in FIG. 5) between each inner periphery of the exterior and the outer periphery of the light-shielding layer in the corresponding display.

In the display device according to the second aspect, preferably, the exterior is joined to a first surface of each display adjacent to the viewing side of the display device, and the antireflective plate is joined to a first surface of the exterior adjacent to the viewing side. In this case, since the antireflective plate is positioned at a distance from the first surface of each display, the transfer of heat from each display to the antireflective plate can be prevented. Accordingly, the antireflective plate can be prevented from being deteriorated by heating. In this arrangement where the antireflective plate is positioned at a distance from the first surface of each display, light is reflected by the first surface of the display and is reflected by a second surface of the antireflective plate remote from the viewing side. Therefore, it is preferable that the display device further include an antireflection (AR) coating layer disposed on at least one of the second surface of the antireflective plate opposed to each display and the first surface of each display opposed to the antireflective plate. Alternatively, the display device may further include a light-transmissive filler disposed in a space between the first surface of each display and the second surface of the antireflective plate. In each of the above-described arrangements, advantageously, the reflection of light by the first surface of each display and that by the second surface of the antireflective plate can be prevented.

In the display device according to the second aspect, the exterior may be a plate-shaped member disposed on second surfaces of the respective displays remote from the viewing side. In this case, advantageously, the exterior can be easily joined to the displays and the mechanical strength of each display can be enhanced by the exterior.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
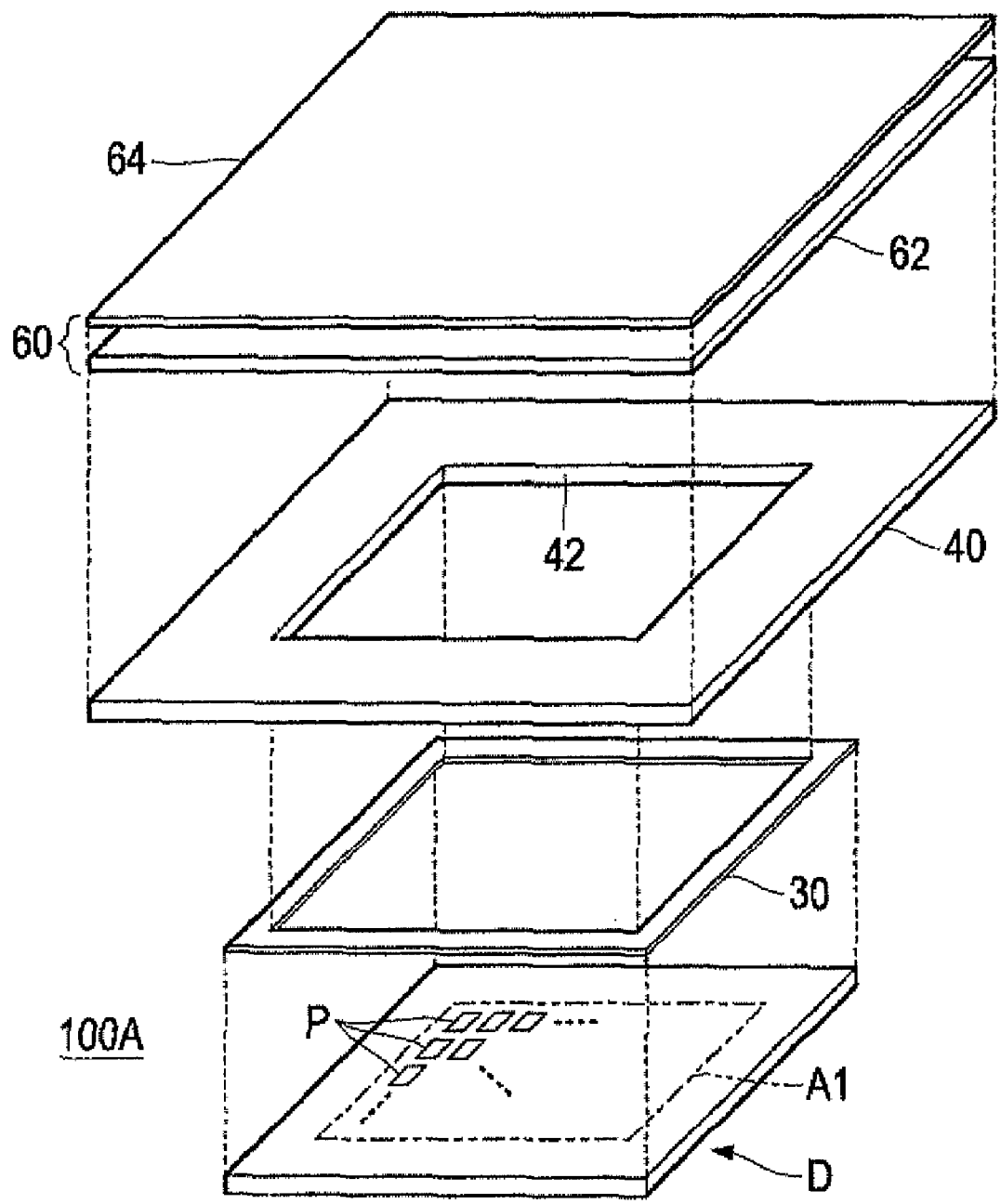
FIG. 1 is an exploded perspective view of a display device according to a first embodiment of the present invention.

Embodiments of the present invention will be described below with reference to the drawings. In the following description, components designated by the same reference numeral have the same operation and function unless the operation or function is especially mentioned.

First Embodiment

Figure 2:
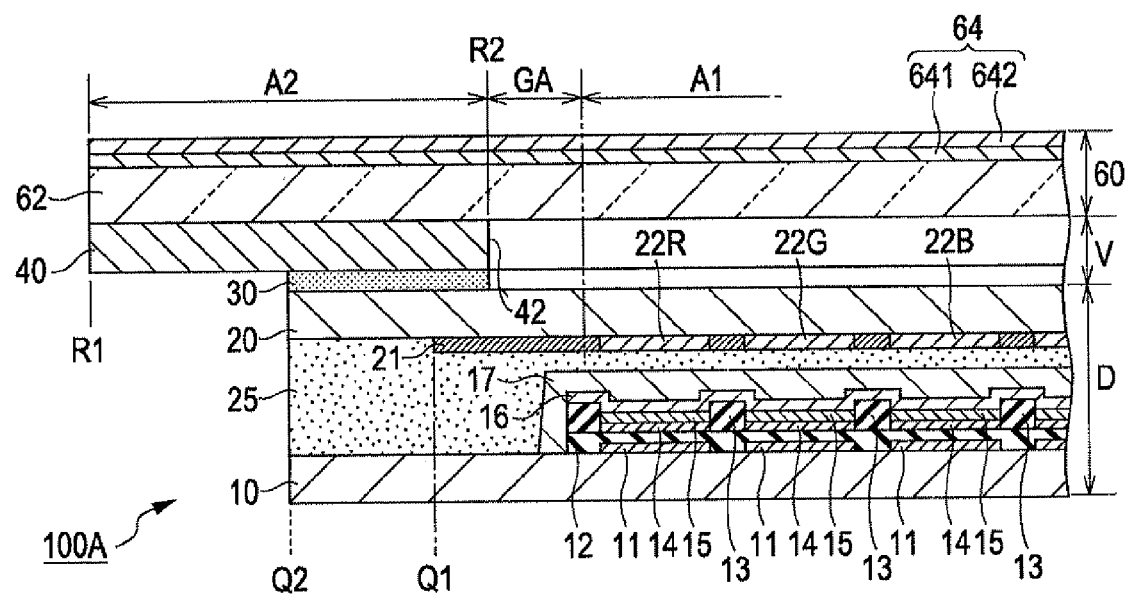
FIG. 2 is a cross-sectional view of the display device of FIG. 1.

FIG. 1 is an exploded perspective view of a display device 100A according to a first embodiment of the present invention. FIG. 2 is a cross-sectional view of the display device 100A. Referring to FIGS. 1 and 2, the display device 100A is a flat assembly including a display D, an exterior 40, and an antireflective plate 60. The display D includes a plurality of pixels P arranged two-dimensionally within a display area A1 and displays various images using the pixels P.

Referring to FIG. 2, the display D includes a first substrate 10 and a second substrate 20 connected to each other, with a light-transmissive joining layer 25 therebetween. The second substrate 20 is located adjacent to the front (viewing) side of the display D (i.e., adjacent to a viewer who views an image displayed on the display D) above the first substrate 10. On a first surface of the first substrate 10 opposed to the second substrate 20, a plurality of light-reflecting layer segments 11 are arranged in spaced-apart relationship such that each light-reflecting layer segment is disposed in the corresponding pixel P. The light-reflecting layer segments 11 are film segments made of a light-reflective material. Instead of the light-reflecting layer segments 11, a single light-reflecting layer 11 may be arranged so as to continuously cover the whole of the display area A1.

In the first surface of the first substrate 10, a light-transmissive insulating layer 12 is arranged so as to cover the light-reflecting layer segments 11. On the insulating layer 12, a plurality of first electrodes 14 are spaced apart from one another such that each first electrode 14 is disposed in the corresponding pixel P. The first electrodes 14 are made of a light-transmissive conductive material, such as indium tin oxide (ITO). As shown in FIG. 2, the light-reflecting layer segments 11 are superimposed on the first electrodes 14, respectively, as viewed from the direction perpendicular to the first substrate 10.

The insulating layer 12 is overlaid with a partition layer (bank layer) 13. The partition layer 13, serving as a grid insulating layer, partitions a space on the first substrate 10 into regions corresponding to the respective pixels P. In a space surrounded by the inner surface of each cell of the partition layer 13, a luminous layer segment 15 made of an organic electroluminescent material is arranged on the first electrode 14. The partition layer 13 and the luminous layer segments 15 are covered with a second electrode 16. The second electrode 16 is a light-transmissive conductive film continuously covering the pixels P. Each luminous layer segment 15 emits white light whose intensity depends on electric energy supplied from the first electrode (anode) 14 to the second electrode (cathode) 16. Both of light, which is emitted from the luminous layer segments 15 to the viewing side, and light, which is reflected by the light-reflecting layer segments 11, pass through the second electrode 16 and emerge on the viewing side, thus displaying various images. The respective components on the first substrate 10 are sealed by a light-transmissive seal 17.

The second substrate 20 is a light-transmissive plate. On a second substrate of the second substrate 20 opposed to the first substrate 10, a light-shielding layer 21 and a plurality of colored layer segments 22 (22R, 22G, and 22B) are arranged. The light-shielding layer 21 has openings (superimposed on the first electrodes 14 and the light-reflecting layer segments 11) corresponding to the respective pixels P and shields a region between the pixels P against light.

Figure 3:
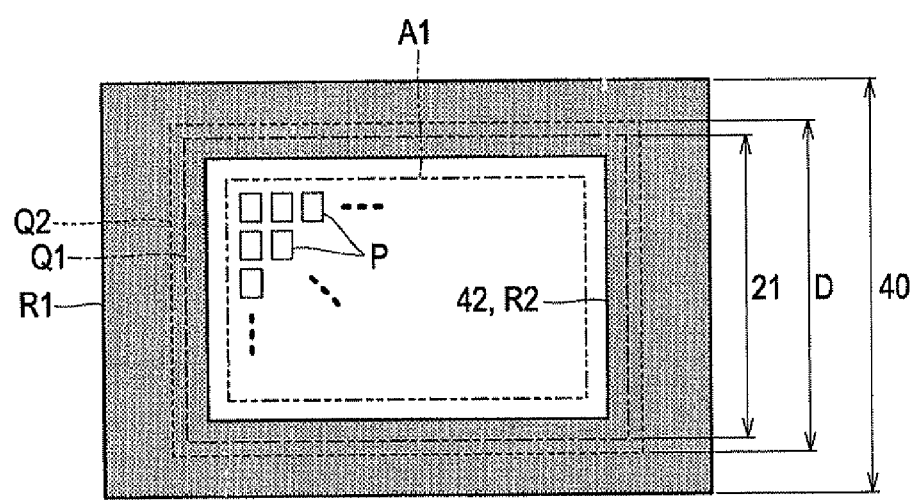
FIG. 3 is a plan view of the display device of FIG. 1, FIG. 3 showing the relationship between components of the display device.

FIG. 3 is a plan view of the display device 100A and conceptually shows the relationship among the components of the display device 100A. In FIG. 3, the antireflective plate 60 is not shown. Referring to FIGS. 2 and 3, the outer dimension of the light-shielding layer 21 is larger than the display area A1. Therefore, the outer periphery Q1 of the light-shielding layer 21 is located outside the display area A1.

Referring to FIG. 2, each of the respective colored layer segments 22 is a light-transmissive colored film (22R, 22G, or 22B) of any of display colors. The colored layer segments 22 are arranged in the openings of the light-shielding layer 21, respectively. Therefore, the colored layer segments 22 are arranged two-dimensionally within the display area A1. Light emitted from the luminous layer segments 15 passes through the respective colored layer segments 22 and emerges on the viewing side of the display device 100A, so that the viewer perceives a color image.

Referring to FIGS. 1 and 2, the exterior 40 is an opaque frame-shaped plate having a rectangular opening 42. The exterior 40 is attached to a first surface of the display D (i.e., a first surface of the second substrate 20) adjacent to the viewing side with a double-faced adhesive tape 30. For example, an aluminum plate painted black is suitable for the exterior 40.

Referring to FIGS. 2 and 3, the outer dimension (the length of each side of the outer periphery R1) of the exterior 40 is greater than the outer dimension (the length of each side of the first substrate 10 or the second substrate 20) of the display D. The exterior 40 and the display D are fixed such that the outer periphery R1 of the exterior 40 is located outside the periphery Q2 of the display D (the first substrate 10 or the second substrate 20). In other words, a first surface (hereinafter, referred to as "frame area") of the exterior 40 adjacent to the viewing side includes a portion located outside the periphery Q2 of the display D. The display area A1 is located within the opening 42 (the inner periphery R2 of the exterior 40). The outer periphery Q1 of the light-shielding layer 21 is located outside the opening 42 (the inner periphery R2 of the exterior 40).

Referring to FIGS. 1 and 2, the antireflective plate 60 is a rectangular plate formed such that the periphery (the size and shape) of the antireflective plate 60 matches the outer periphery R1 of the exterior 40. The area of the antireflective plate 60 is greater than that of the first substrate 10 and that of the second substrate 20. Referring to FIG. 2, the antireflective plate 60 is joined to the frame area A2 such that the periphery of the antireflective plate 60 is aligned with the outer periphery R1 of the exterior 40. Therefore, the antireflective plate 60 is continuously arranged in the display area A1 and the frame area A2 so as to cover both of the display D exposed in the opening 42 of the exterior 40 and the exterior 40. Referring to FIG. 2, a space V is disposed between a second surface of the antireflective plate 60 and the first surface of the display D (or the second substrate 20) in the opening 42. The height of the space V corresponds to the sum of the thickness of the exterior 40 and that of the double-faced adhesive tape 30. As described above, since the antireflective plate 60 and the display D are spaced apart from each other with the space V therebetween, it is more difficult to transfer heat generated in the display D to the antireflective plate 60 than an arrangement in which the antireflective plate 60 is in tight contact with the display D. Advantageously, therefore, the antireflective plate 60 (especially, a circular polarizer 64 included therein) can be prevented from being deteriorated by heating.

Referring to FIGS. 1 and 2, the antireflective plate 60 includes a support 62 and the circular polarizer 64. The support 62 is a light-transmissive plate that enhances the mechanical strength of the circular polarizer 64. A substrate made of glass or resin (e.g., acrylic resin or polycarbonate resin) is suitable for the support 62. Referring to FIG. 2, the circular polarizer 64 includes a retardation film 641 attached to a first surface of the support 62 adjacent to the viewing side and a polarizer 642 attached to the retardation film 641. Therefore, even when external light enters the viewing side of the display device 100A and is reflected by the light-reflecting layer segments 11 or the frame area A2 of the exterior 40, the reflected light can be prevented from emerging on the viewing side.

Figure 4:
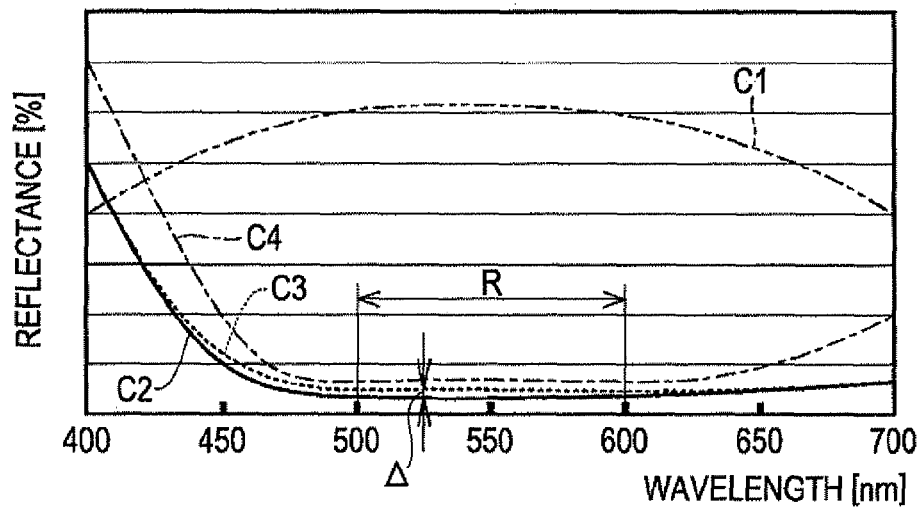
FIG. 4 is a graph showing optical characteristics of portions of the display device of FIG. 1.

FIG. 4 is a graph showing the characteristics of reflected light that emerges on the viewing side when visible light (hereinafter, referred to as "measurement light") having a predetermined spot diameter is applied to portions of the display device 100A adjacent to the viewing side. The graph of FIG. 4 shows the reflectance (i.e., the proportion (%) of the amount of reflected light to that of measurement light) plotted against the wavelength (nm) of the measurement light.

Referring to FIG. 4, the characteristic C1 corresponds to the result of measurement obtained when the antireflective plate 60 is removed from the display device 100A, the luminous layer segments 15 for all of the pixels P are completely turned off, and measurement light is applied to the display area A1. The characteristic C2 corresponds to the result of measurement obtained when the antireflective plate 60 is arranged in the display device 100A in accordance with the present embodiment, the luminous layer segments 15 for all of the pixels P are completely turned off, and measurement light is applied to the display area A1 through the antireflective plate 60. As will be understood from the comparison between the characteristics C1 and C2, the amount of light that emerges on the viewing side after being reflected by the respective components (especially, the light-reflecting layer segments 11) of the display D is sufficiently reduced by the antireflective plate 60 as compared with the total amount of light incident on the viewing side of the display device 100A. Accordingly, a reflection of a view in front of the display device 100A can be prevented.

Referring to FIG. 4, the characteristic C3 corresponds to the result of measurement obtained when the antireflective plate 60 is arranged in the display device 100A in accordance with the present embodiment and measurement light is applied through the antireflective plate 60 to the frame area A2 of the exterior 40. As will be understood from the comparison between the characteristics C2 and C3, the optical characteristics of the frame area A2 of the exterior 40 and those of the respective components of the display D are chosen so that the light-reflecting characteristic of the frame area A2 of the exterior 40 substantially (nearly) matches that of the display area A1 of the display D. More specifically, assuming that a reflectance in the frame area A2 of the exterior 40 and that in the display area A1 of the display D are measured by individually applying measurement light having the same wavelength to those areas and the difference $\Delta$ between the measured reflectances is calculated, the optical characteristics (more specifically, a material and a method of processing) of the frame area A2 of the exterior 40 and those of the respective components of the display D are chosen so that a maximum value of the difference $\Delta$ is 3% or less (preferably, 1% or less) when the wavelength lies in the range R from 500 nm to 600 nm. For example, the exterior 40 is formed by applying a coating having optical characteristics that satisfy the above-described requirements for the previously measured reflectance of the display area A1 of the display D to the first surface (the frame area A2) of the plate.

According to the present embodiment, as described above, the antireflective plate 60 having a size and shape to continuously cover the display area A1 and the frame area A2 is arranged so as to cover both of the exterior 40 and the display D. Advantageously, in addition to preventing the reflection of a view in front of the display device 100A, the border between the exterior 40 and the display D can be obscured as compared to an arrangement in which the antireflective plate 60 is not disposed and another arrangement in which the antireflective plate 60 is superimposed only on the display area A1. In the present embodiment, since the characteristics of the exterior 40 and those of the display D are chosen so that the light-reflecting characteristic (reflectance) of the frame area A2 substantially (nearly) matches that of the display area A1, the above-described advantages become pronounced especially. In addition, since the border between the exterior 40 and the display D is obscured, this gives a user an illusion that the display area of the display device 100A extends nearly to the outer periphery R1 of the exterior 40 (so as to substantially cover the antireflective plate 60). According to the present embodiment, advantageously, the apparent area of the display area can be increased without increasing the size of the display device 100A.

When light emission is performed in the whole of the display area A1, the user perceives the border between the display area A1 and the frame area A2, where light emission is not performed. Accordingly, the advantage of increasing the apparent area of the display area is especially effective when the display device displays an image in which a subject is arranged in the center of the display area A1 such that the background color is black, serving as a gray level upon turning off the luminous layer segments 15 (i.e., an image in which the optical characteristics of a non-light-emitting region excluding the subject in the display area A1 are the same as those of the frame area A2).

In the above description, the result of measurement obtained when measurement light is applied to the display area A1 is shown as the characteristic C2. The result of measurement, obtained when measurement light is applied to an area (where the light-shielding layer 21 is arranged) GA that is located outside the display area A1 within the opening 42 of the exterior 40, is substantially the same as that corresponding to the characteristic C2. Accordingly, the optical characteristics of the exterior 40 and those of the display D may be chosen so that the light-reflecting characteristic of the area GA substantially (nearly) matches that of the frame area A2 of the exterior 40.

Figure 5:
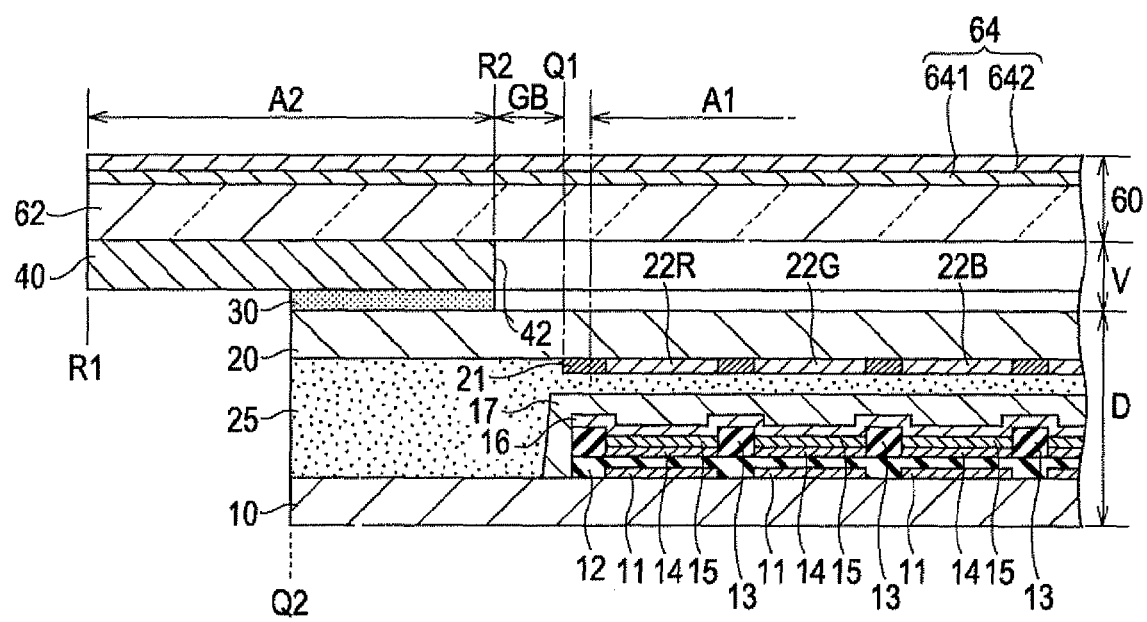
FIG. 5 is a cross-sectional view of a display device according to a modification of the first embodiment.

In the arrangement shown in FIG. 2, the outer periphery Q1 of the light-shielding layer 21 is located outside the opening 42 of the exterior 40. An arrangement where, as shown in FIG. 5, the outer periphery Q1 of the light-shielding layer 21 is located within the opening 42 (the inner periphery R2) of the exterior 40 may be used. The characteristic C4 in FIG. 4 corresponds to the result of measurement obtained when measurement light is applied to an area GB between the outer periphery Q1 of the light-shielding layer 21 and the inner periphery R2 of the exterior 40 in the arrangement of FIG. 5 to measure the reflectance of the area GB.

In the area GB in the first substrate 10, lines (not shown) for supply of a driving signal and a power supply potential to the display area A1 are arranged. Accordingly, the characteristic C4 of the area GB differs from the characteristic C3 of the frame area A2 of the exterior 40 and also differs from the characteristic C2 of the display area A1, as shown in FIG. 4. In the arrangement of FIG. 5, therefore, the advantage in that the border between the exterior 40 and the display D is obscured is certainly obtained as compared to the arrangement (the characteristic C1) excluding the antireflective plate 60. However, the possibility of the border being perceived is higher than the arrangement of FIG. 2. In other words, the arrangement of FIG. 2 has advantages in that the border between the exterior 40 and the display D is obscured more than the arrangement of FIG. 5 because the outer periphery Q1 of the light-shielding layer 21 is located outside the inner periphery R2 of the exterior 40.

Second Embodiment

Figure 6:
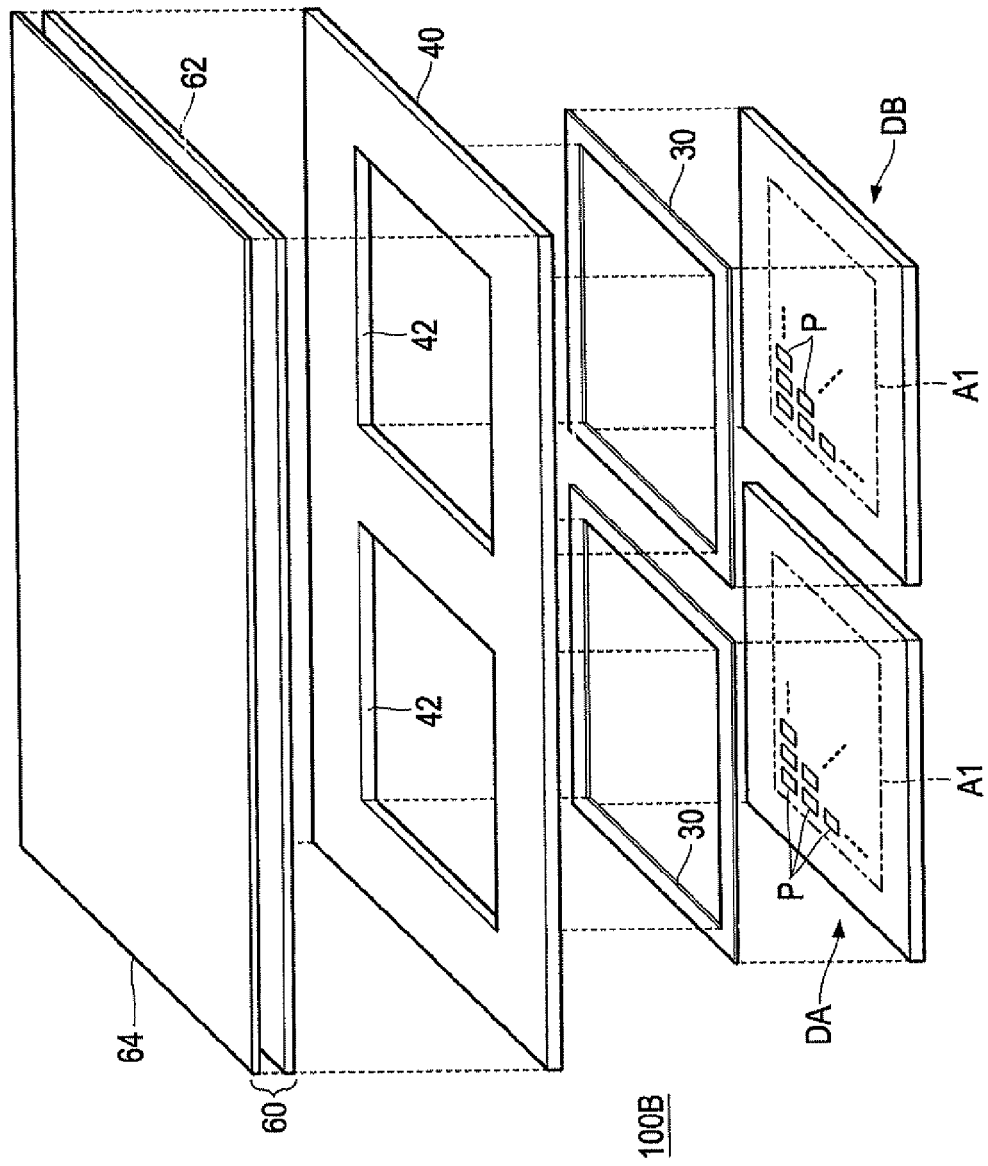
FIG. 6 is an exploded perspective view of a display device according to a second embodiment of the present invention.

FIG. 6 is an exploded perspective view of a display device 100B according to a second embodiment of the present invention. Referring to FIG. 6, the display device 100B is a flat assembly including, in series, a first display DA and a second display DB that are disposed in spaced-apart relationship in the same plane, an exterior 40, and an antireflective plate 60. The first and second displays DA and DB each have the same structure as that of the display D according to the first embodiment. The displays DA and DB each display various images using a plurality of pixels P arranged two-dimensionally in a display area A1. In the following description, when it is unnecessary to distinguish between the first display DA and the second display DB, the first and second displays DA and DB will be called "displays D".

Figure 7:
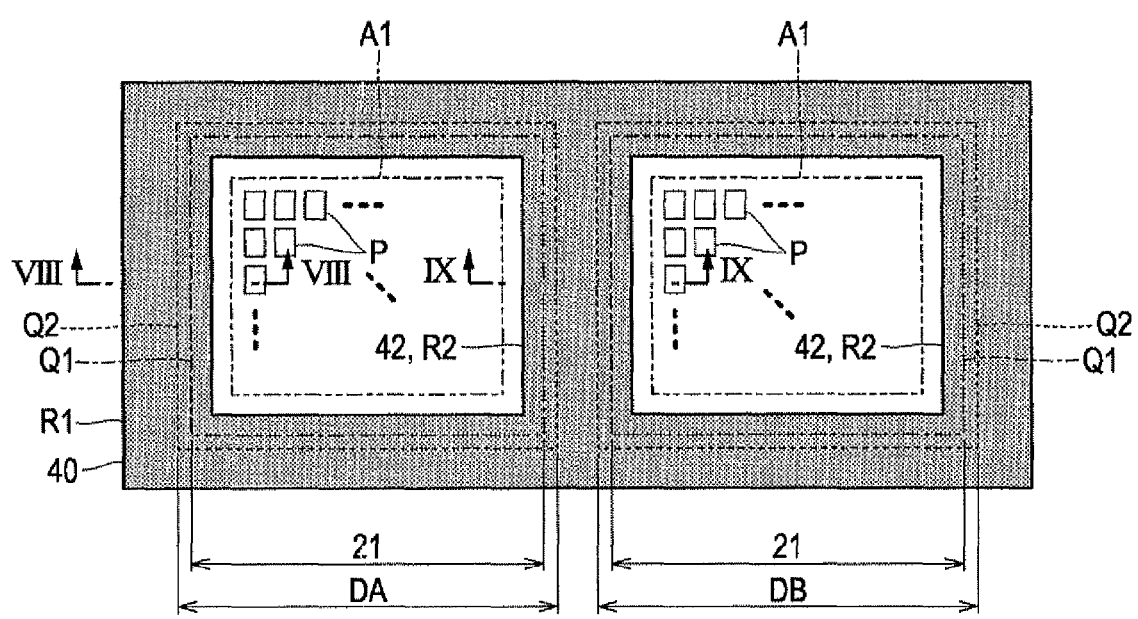
FIG. 7 is a plan view of the display device of FIG. 6, FIG. 7 showing the relationship between components of the display device.
Figure 8:
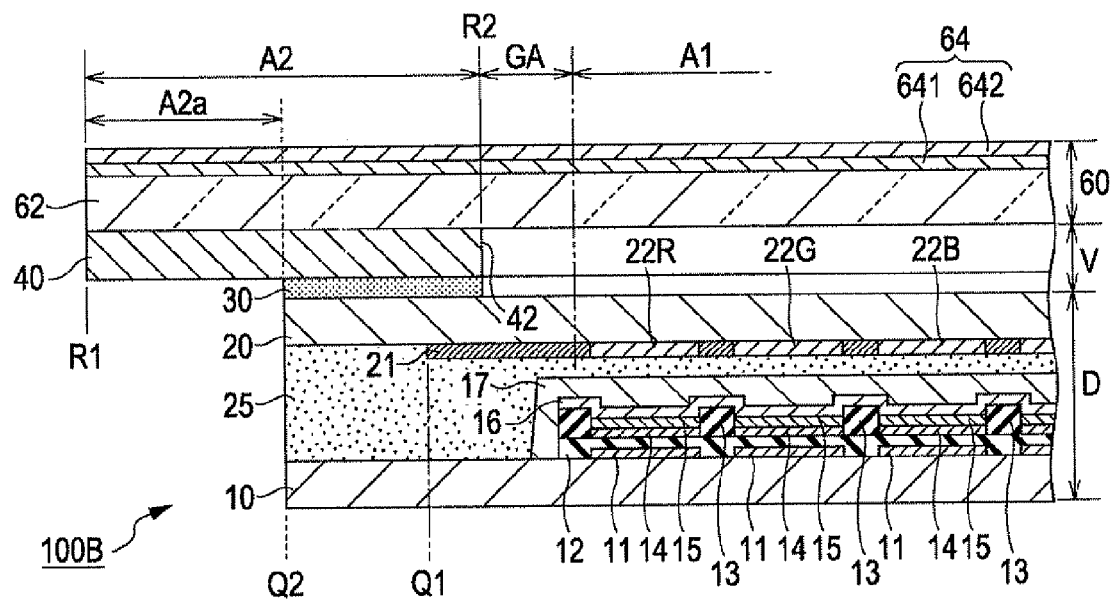
FIG. 8 is a cross-sectional view taken along the line VIII-VIII in FIG. 7.
Figure 9:
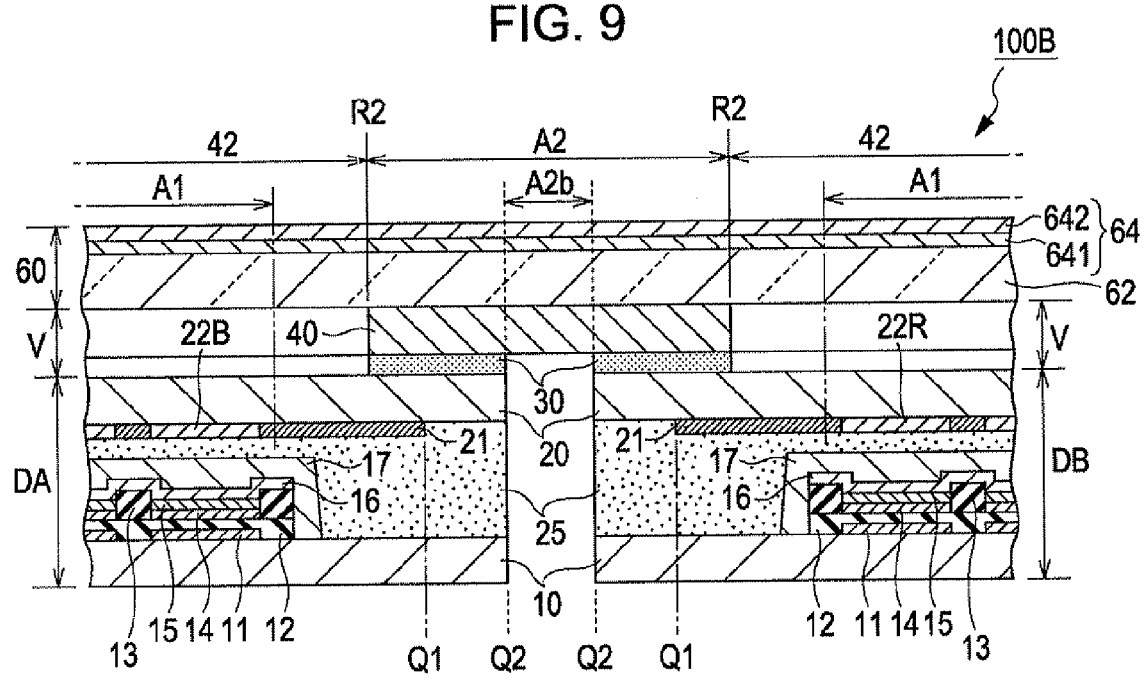
FIG. 9 is a cross-sectional view taken along the line IX-IX in FIG. 7.

FIG. 7 is a plan view of the display device 100B and conceptually shows the relationship among respective components of the display device 100B. In FIG. 7, the antireflective plate 60 is not shown. FIG. 8 is a cross-sectional view taken along the line VIII-VIII in FIG. 7 (i.e., a cross-sectional view of a portion in the vicinity of the periphery of the exterior 40). FIG. 9 is a cross-sectional view taken along the line IX-IX in FIG. 7 (i.e., a cross-sectional view of a portion in the vicinity of a region between the first display DA and the second display DB). Referring to FIGS. 7 and 8, the outer dimension of a light-shielding layer 21 is larger than that of the display area A1. Accordingly, the outer periphery Q1 of the light-shielding layer 21 is located outside the display area A1.

Referring to FIGS. 6 and 7, the exterior 40 is an opaque plate having two rectangular openings 42 which correspond to the first display DA and the second display DB, respectively. The exterior 40 is attached to first surfaces of the displays D (i.e., first surfaces of respective second substrates 20) adjacent to the viewing side of the display device 100B with double-faced adhesive tapes 30.

Referring to FIGS. 7 and 8, the exterior 40 and the displays D are fixed such that the outer periphery R1 of the exterior 40 is located outside the peripheries Q2 of the respective displays D. Therefore, a frame area A2, serving as a first surface of the exterior 40 adjacent to the viewing side, includes a portion A2a located outside the peripheries Q2 of the respective displays D, as shown in FIG. 8. In addition, since the first display DA is spaced apart from the second display DB in the present embodiment, the frame area A2 includes a portion A2b between the first display DA and the second display DB, as shown in FIG. 9. Referring to FIGS. 7 to 9, the display area A1 of each display D is located within the corresponding opening 42 (the corresponding inner periphery R2 of the exterior 40). The outer periphery Q1 of the light-shielding layer 21 in each display D is located outside the corresponding opening 42 (the corresponding inner periphery R2 of the exterior 40).

Referring to FIGS. 6 and 8, the antireflective plate 60 is a rectangular plate formed so as to match the outer periphery R1 of the exterior 40 in size and shape. The area of the antireflective plate 60 is greater than the total area of the first and second displays DA and DB. The antireflective plate 60 includes a support 62 and a circular polarizer 64 in a manner similar to the first embodiment.

The antireflective plate 60 is attached to the frame area A2 such that the periphery of the antireflective plate 60 is aligned with the outer periphery R1 of the exterior 40. Therefore, the antireflective plate 60 is continuously disposed over the respective display areas A1 and the frame area A2 so as to cover the first and second displays DA and DB exposed in the respective openings 42 and further cover the exterior 40. Referring to FIGS. 8 and 9, a space V is disposed between a second surface of the antireflective plate 60 and the first surface of each display D. Accordingly, it is more difficult to transfer heat generated in the displays D to the antireflective plate 60 than an arrangement in which the antireflective plate 60 is in tight contact with the displays D. Advantageously, therefore, the circular polarizer 64 can be prevented from being deteriorated by heating.

As described above with reference to FIG. 4, in the present embodiment, the optical characteristics of the frame area A2 of the exterior 40 and those of the respective components of the displays D are chosen so that the light-reflecting characteristic of the frame area A2 of the exterior 40 substantially matches that of the display area A1 of each display D. More specifically, assuming that the reflectance of the frame area A2 of the exterior 40 and that of the display area A1 of each display D are measured by individually applying measurement light having the same wavelength to those areas and the difference Δ between the measured reflectances is calculated, the optical characteristics of the frame area A2 of the exterior 40 and those of the respective components of the display D are chosen so that a maximum value of the difference Δ is 3% or less (preferably, 1% or less) when the wavelength lies in the range R from 500 nm to 600 nm.

According to the present embodiment, as described above, the antireflective plate 60 having a size and shape to continuously cover the display areas A1 and the frame area A2 is arranged so as to cover the exterior 40 and the displays D. Advantageously, in addition to preventing a reflection of a view in front of the display device 100B, the border between the exterior 40 (i.e., each of the portions A2a and A2b) and each display D can be obscured more than an arrangement in which the antireflective plate 60 is not arranged and another arrangement in which the antireflective plate 60 is superimposed only on the display area A1 of each display D. In the present embodiment, since the characteristics of the exterior 40 and those of each display D are chosen so that the light-reflecting characteristic (reflectance) of the frame area A2 substantially (nearly) matches that of the display area A1, the above-described advantages become pronounced especially. In addition, since the border between the exterior 40 and each display D is obscured, this gives the user an illusion that the display area of the display device 100B extends nearly to the outer periphery R1 of the exterior 40 (the whole of the antireflective plate 60). According to the present embodiment, advantageously, the apparent area of the display area of the display device 100B can be increased without increasing the size of the display device 100B.

Third Embodiment

A third embodiment of the present invention will now be described. The following description will be made with respect to a structure based on that according to the first embodiment as an example. Third to sixth embodiments may be similarly applied to the display device 100B having a plurality of displays D (DA, DB) according to the second embodiment.

Figure 10:
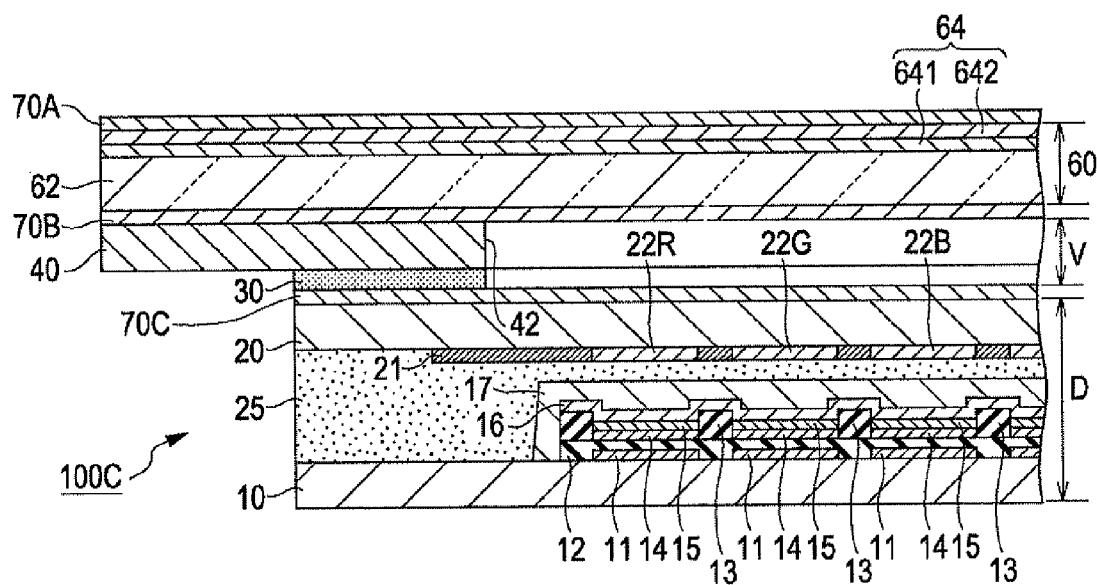
FIG. 10 is a cross-sectional view of a display device according to a third embodiment of the present invention.

FIG. 10 is a cross-sectional view of a display device 100C according to a third embodiment of the present invention. Referring to FIG. 10, in the display device 100C, the surface of each light-transmissive component in contact with the air is covered with an antireflection (AR) coating layer 70 (70A, 70B, 70C) for preventing reflection on the surface. More specifically, the AR coating layer 70A is disposed on a first surface of an antireflective plate 60 (or a circular polarizer 64) adjacent to the viewing side of the display device 100C, the AR coating layer 70B is disposed on a second surface of the antireflective plate 60 (or a support 62) remote from the viewing side. Furthermore, the AR coating layer 70C is disposed on a first surface of a display D (a second substrate 20) adjacent to the viewing side.

In the arrangement according to the first embodiment, the second surface of the antireflective plate 60 and the first surface of the display D are in contact with the air. Therefore, light reflected by the luminous layer segments 15 tends to be reflected by those surfaces. According to the present embodiment, the AR coating layers 70 (70B, 70C) prevent the reflection of light on the second surface of the antireflective plate 60 and that on the first surface of the display D. Advantageously, the efficiency of use of light reflected by luminous layer segments 15 can be increased. In addition, since the AR coating layer 70A is arranged on the first surface of the antireflective plate 60 adjacent to the viewing side, a reflection of a view in front of the display device 100C caused by the reflection on the first surface can be effectively prevented.

Fourth Embodiment

Figure 11:
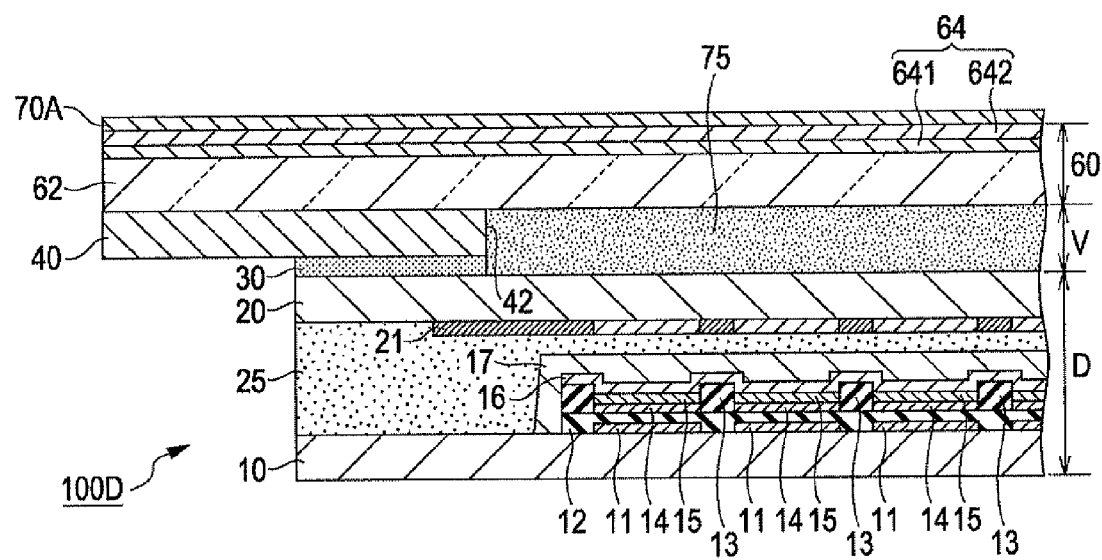
FIG. 11 is a cross-sectional view of a display device according to a fourth embodiment of the present invention.

FIG. 11 is a cross-sectional view of a display device 100D according to a fourth embodiment of the present invention. Referring to FIG. 11, a space V is defined by a second surface of an antireflective plate 60 (a support 62) remote from the viewing side of the display device 100D, a first surface of a display D (a second substrate 20) adjacent to the viewing side, and the inner surface of an opening 42 of an exterior 40. The space V is filled with a light-transmissive filler 75. The filler 75 comprises, for example, a resin material. The refractive index of the filler 75 is the same as that of at least one of the support 62 and the second substrate 20.

In the above-described arrangement, since the difference between the refractive index of the space V and that of the support 62 or the second substrate 20 is smaller than that in the arrangement in which the space V contains the air, the reflection of light on the second surface of the antireflective plate 60 and that on the first surface of the display D are reduced. Accordingly, although the AR coating layers 70B and 70C in the third embodiment are not arranged, the efficiency of use of light reflected by luminous layer segments 15 can be increased. The AR coating layers 70B and 70C in FIG. 10 may be arranged in the arrangement shown in FIG. 11.

Fifth Embodiment

Figure 12:
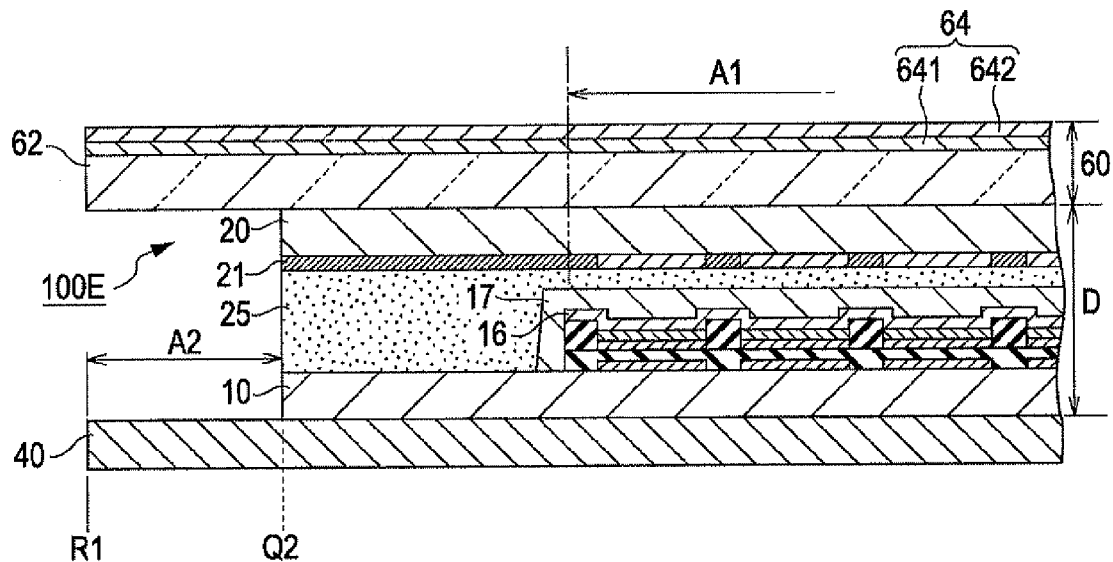
FIG. 12 is a cross-sectional view of a display device according to a fifth embodiment of the present invention.

FIG. 12 is a cross-sectional view of a display device 100E according to a fifth embodiment of the present invention. Referring to FIG. 12, in the present embodiment, an exterior 40 is a plate disposed on a second surface of a display D remote from the viewing side of the display device 100E. The exterior 40 has no opening. The second surface of the display D (or a first substrate 10) is joined to a first surface of the exterior 40. In the first surface of the exterior 40 adjacent to the viewing side, a portion, located outside the periphery Q2 of the display D, serves as a frame area A2. A light-shielding layer 21 in the display D is disposed over a second surface of a second substrate 20 remote from the viewing side.

An antireflective plate 60 is continuously disposed over the frame area A2 and a display area A1 so as to cover the exterior 40 and the display D. Furthermore, the optical characteristics of the frame area A2 of the exterior 40 and those of respective components of the display D are chosen so that the light-reflecting characteristic of the frame area A2 of the exterior 40 substantially matches that of the display area A1 of the display D in a manner similar to the first embodiment. Accordingly, the same advantages as those in the first embodiment can be obtained in the present embodiment. The present embodiment further has advantages in that an operation of joining the exterior 40 to the display D is made easier and the exterior 40 enhances the mechanical strength of the display D. The display device 100E according to the present embodiment may further include the AR coating layers 70 (70A, 70B, 70C) according to the third embodiment.

Sixth Embodiment

Figure 13:
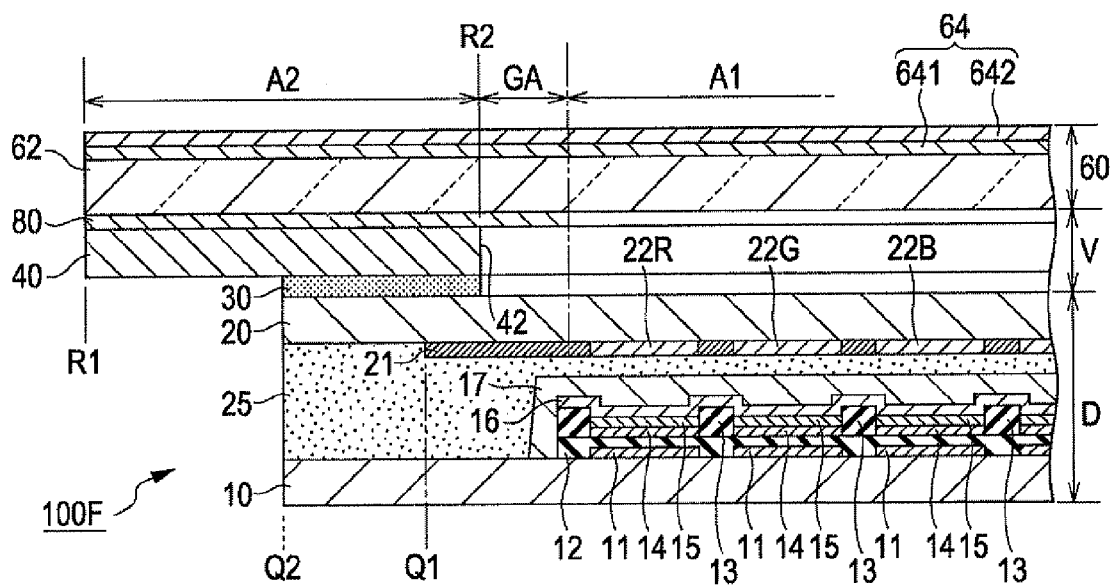
FIG. 13 is a cross-sectional view of a display device according to a sixth embodiment of the present invention.

FIG. 13 is a cross-sectional view of a display device 100F according to a sixth embodiment of the present invention. Referring to FIG. 13, the display device 100F according to the present embodiment has a structure obtained by further providing a characteristic control layer 80 for the display device 100A according to the first embodiment. The characteristic control layer 80 is a light-reflective (light-shielding) film which is disposed on a second surface of an antireflective plate 60 (i.e., a second surface of a support 62 opposed to a display D) so as to cover a region located outside a display area A1 of the display D. The characteristic control layer 80 is made of a resin material containing scattered pieces of a black material, such as carbon black, or a light-shielding metallic material, such as chromium. The characteristic control layer 80 may be arranged by coating the antireflective plate 60 with a black coating material.

A method of processing the characteristic control layer 80, a material for the layer 80, and the thickness of the layer 80 are chosen so that the light-reflecting characteristic of a first surface of the characteristic control layer 80 in contact with the antireflective plate 60 substantially matches that of the display area A1 of the display D. In other words, the characteristic control layer 80 is formed under conditions similar to the foregoing conditions, described with reference to FIG. 4, for the frame area A2 of the exterior 40 and the display area A1 of the display D. Namely, the characteristic control layer 80 is formed so that a maximum value of the difference Δ between the reflectance of the characteristic control layer 80 and that of the display area A1 of the display D is 3% or less (preferably, 1% or less) upon application of light having a wavelength in the range R from 500 nm to 600 nm.

As described above, the optical characteristics of the characteristic control layer 80 located adjacent to the viewing side of the display device 100F relative to the exterior 40 match those of the display area A1. Therefore, even when the light-reflecting characteristic (reflectance) of the frame area A2 of the exterior 40 differs from that of the display area A1 of the display D, the present embodiment has an advantage in that the apparent area of the display area can be increased, the advantage being the same as that of the first embodiment. Accordingly, the present embodiment is especially suitable for a case where it is difficult to match the optical characteristics of the exterior 40 with those of the display area A1 of the display D (for example, a material for the exterior 40 or a method of processing the exterior 40 is limited). In other words, since optical conditions required for the exterior 40 are relaxed, the exterior 40 can be formed at low cost.

Figure 14:
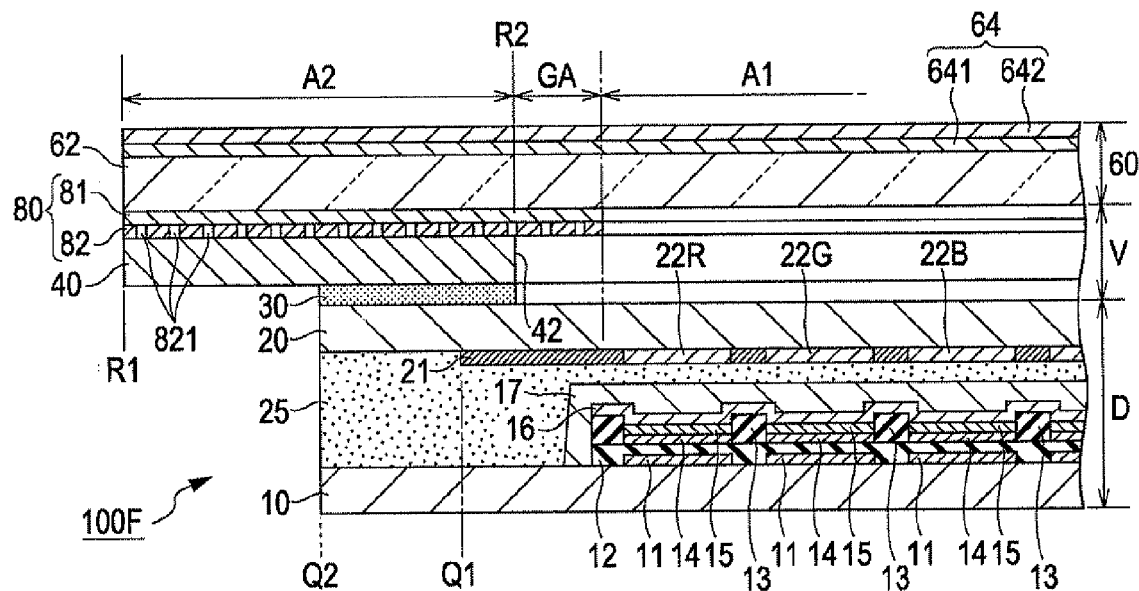
FIG. 14 is a cross-sectional view of a display device according to a modification of the sixth embodiment of the present invention.

FIG. 13 illustrates the arrangement in which the characteristic control layer 80 includes a single layer. As shown in FIG. 14, the characteristic control layer 80 may be a laminate including a plurality of sublayers. Referring to FIG. 14, the characteristic control layer 80 includes a first sublayer 81 and a second sublayer 82. The first sublayer 81 is a light-reflective (light-shielding) film disposed on the second surface of the antireflective plate 60 (in a region outside the display area A1). The second sublayer 82 is a light-shielding film arranged on the first sublayer 81. The first and second sublayers 81 and 82 are made of different materials selected from various light-shielding materials, such as a resin material containing scattered pieces of a black material, e.g., carbon black, and a light-shielding metallic material, e.g., chromium. For example, it is preferred that the first sublayer 81 be made of one of aluminum and chromium and the second sublayer 82 be made of the other one of them. Referring to FIG. 14, the second sublayer 82 has many openings 821 formed by patterning. The openings 821 are uniformly distributed to-dimensionally in the second sublayer 82.

Since the first sublayer 81 is sufficiently thin, the optical characteristics of the first surface of the characteristic control layer 80 in contact with the antireflective plate 60 depend on the characteristics of the first sublayer 81 and also depend on those of the second sublayer 82. In other words, the optical characteristics of the characteristic control layer 80 change according to the size of each opening 821 arranged in the second sublayer 82 and the distribution (the total number or density) of the openings 821. Therefore, appropriately choosing the size and distribution of the openings 821 in the second sublayer 82 enables the light-reflecting characteristic of the characteristic control layer 80 to match that of the display area A1 of the display D with high accuracy (i.e., the border between the characteristic control layer 80 and the display area A1 can be obscured).

FIGS. 13 and 14 each illustrate the arrangement obtained by further providing the characteristic control layer 80 for the display device 100A according to the first embodiment. The display devices shown in FIGS. 6 to 12 (and a display device shown in FIG. 15 which will be described later) may include the characteristic control layer 80.

In the arrangement illustrated in FIG. 14, the first sublayer 81 and the second sublayer 82 are arranged outside the display area A1. When the first sublayer 81 is formed so as to have a thickness such that the first sublayer 81 sufficiently transmits light coming from the display D toward the viewing side (for example, a sufficiently thin aluminum layer is formed as the first sublayer 81), the first sublayer 81 may be disposed over the second surface of the antireflective plate 60. In this arrangement, it is unnecessary to pattern the first sublayer 81 upon formation. The second sublayer 82 may be arranged so as to have the same pattern as that of the light-shielding layer 21 of the display D. A method of controlling the light-reflecting characteristic of the characteristic control layer 80 by appropriately choosing the thickness of the characteristic control layer 80 in FIG. 13 or the thickness of at least one of the first and second sublayers 81 and 82 in FIG. 14 may be preferably used.

Modifications

The above-described embodiments may be modified. Concrete modifications will be described below. Two or more of the following modifications may be selected and be combined.

First Modification

Figure 15:
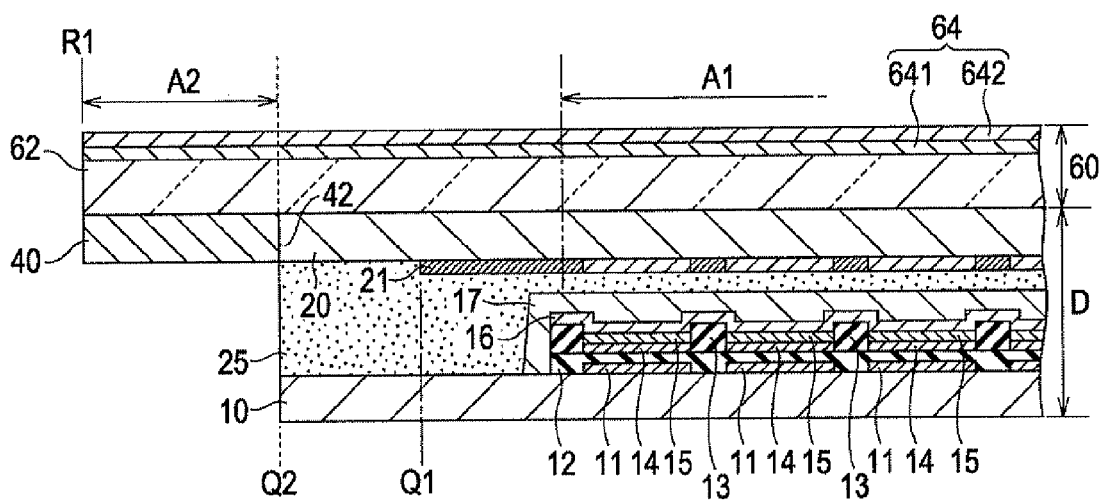
FIG. 15 is a cross-sectional view of a display device according to a modification.

The shape and position of the exterior 40 are not limited to those of the above-described embodiments. For example, the exterior 40 may have an opening 42 substantially matching (or slightly larger than) the outer shape of the display D, as shown in FIG. 15. The display D may be disposed in the opening 42 such that the side end surfaces of the display D face the respective inner surfaces of the opening 42. Since the first surface of the display D (or the second substrate 20) adjacent to the viewing side is flush with the first surface of the exterior 40, serving as the frame area A2, as shown in FIG. 15, the antireflective plate 60 can be easily and tightly joined to the exterior 40 and the display D. In addition, since the space V is eliminated, the display device 100 (100A, 100B, 100C, 100D, 100E, or 100F) can be reduced in thickness.

Second Modification

So long as the circular polarizer 64 independently provides adequate mechanical strength to manufacture and use the display device 100, the support 62 may be omitted in the antireflective plate 60. To prevent breakage of the circular polarizer 64 due to application of an external force, a light-transmissive panel may be disposed on a first surface of the circular polarizer 64 adjacent to the viewing side of the display device 100.

Third Modification

The structure (the size and shape) common to the displays D (DA, DB) in the second embodiment is not essential for the present invention. In other words, the size and shape may differ from display D to another. FIG. 6 illustrates the structure in which the displays D are spaced apart from each other. The displays D may be arranged with no gap therebetween (for example, one side end surface of the display DA may be in contact with the corresponding side end surface of the display DB). According to the second embodiment in which the displays D are spaced apart from each other, however, the apparent area of the display areas can be increased easier than the structure in which the displays D are in contact with each other, and the arrangement (e.g., the positions) of the displays D can be determined more flexibly than that structure.

Fourth Modification

Figure 16:
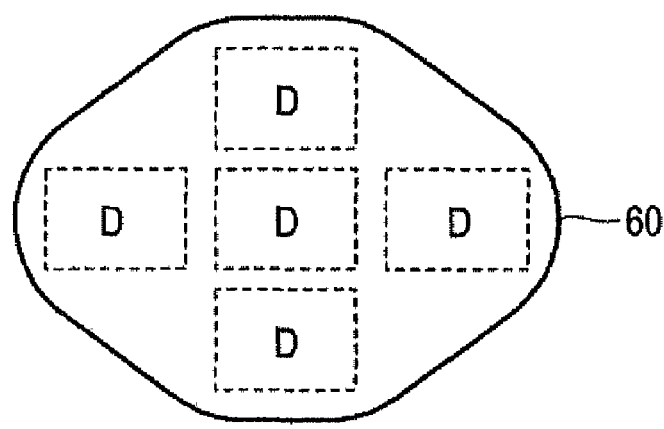
FIG. 16 is a plan view of a display device according to a modification of the second embodiment of the present invention.
Figure 17:
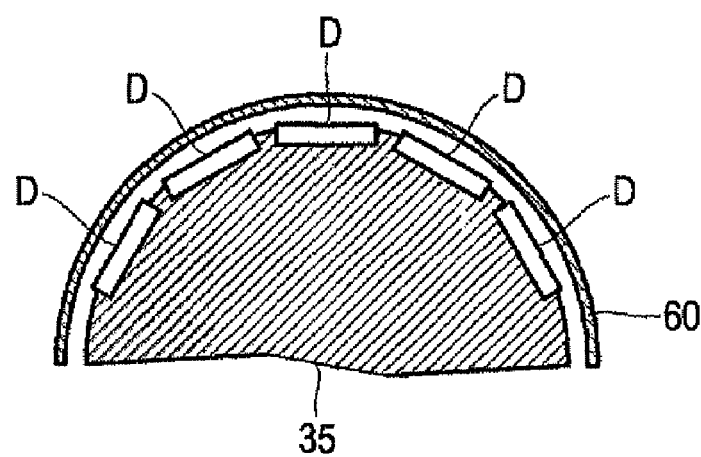
FIG. 17 is a cross-sectional view of a display device according to another modification of the second embodiment.
Figure 18:
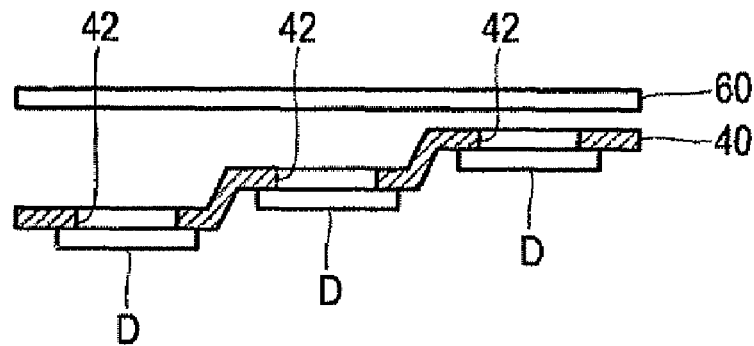
FIG. 18 is a cross-sectional view of a display device according to another modification of the second embodiment.

The arrangement of the displays D in the second embodiment is an example. A concrete arrangement of the displays D will be described below. As will be understood from the following description, the flexibility of designing the display device 100 with a plurality of displays D can be increased as compared to that of designing the display device with a single display D. Display devices illustrated in FIGS. 16 to 18 are particularly suitable for displaying images of, for example, items in various stores.

The number of displays D constituting the display device 100 is any number. For example, five displays D may be arranged in a substantially cross-shaped pattern, as shown in FIG. 16. The exterior 40 (not shown in FIG. 16) and the antireflective plate 60 are each shaped into a proper form to cover all of the displays D.

It is unnecessary to arrange a plurality of displays D in parallel to one another. For example, the displays D may be arranged on the curved wall surface of a structure (e.g., a column 35) of a building, as shown in FIG. 17. The display device 100 in FIG. 17 includes the displays D arranged on the curved surface of the column 35 and the antireflective plate 60 formed so as to follow the curved surface of the column 35. In FIG. 17, the exterior 40 is not shown.

It is unnecessary to arrange a plurality of displays D in the same plane. For example, a plurality of displays D may be arranged such that the displays D are located at different distances from the flat antireflective plate 60, as shown in FIG. 18. In this case, the exterior 40 may be formed in a stepwise shape as shown in FIG. 18.

Fifth Modification

The luminous layer segments 15, made of the organic EL material, are anything more than an example of an electro-optic layer. As for the electro-optic layer used in the display device 100 in each of the above-described embodiments, it is unnecessary to distinguish between a self-luminous type that emits light by itself and a non-luminous type (e.g., a liquid crystal display element) that changes the transmittance to external light and distinguish between a current driven type that is driven by current supply and a voltage driven type that is driven by voltage application. Various electro-optic layers, such as a luminous layer made of an inorganic EL material, a liquid crystal layer, and an electrophoretic layer, are available in the display device according to any of the embodiments of the present invention. In other words, the electro-optic layer is defined as a section whose optical characteristics, such as luminance and transmittance, vary due to supply of electric energy (e.g., current supply or voltage application).

Applications

Electronic apparatuses including the display device according to any of the above-described embodiments of the present invention will now be described. FIGS. 19 to 22 each illustrate an electronic apparatus including the display device 100 (100A, 100B, 100C, 100D, 100E, or 100F) according to any of the above-described embodiments.

Figure 19:
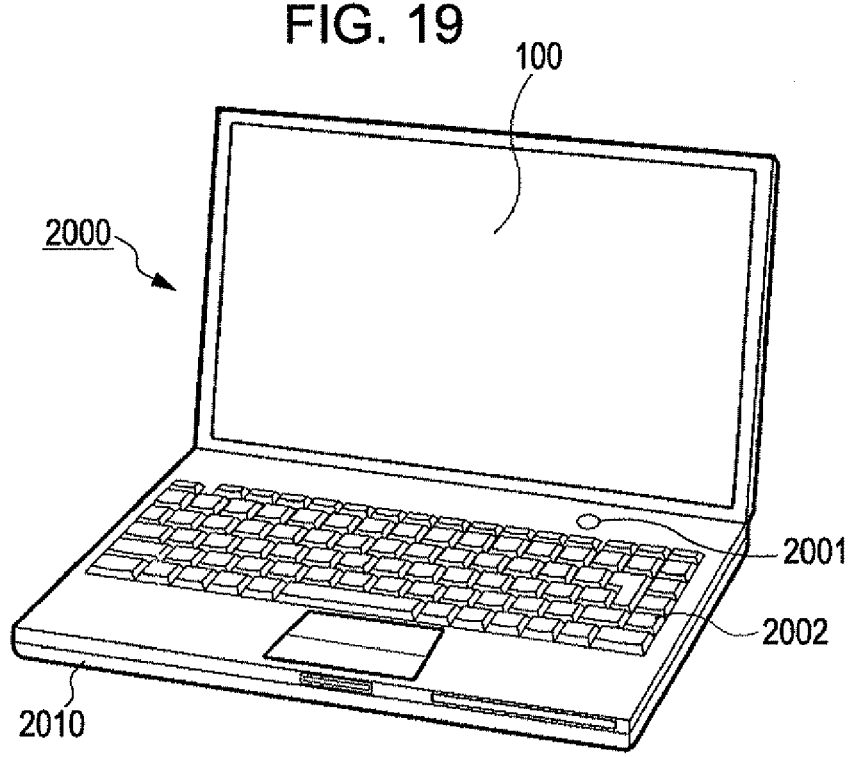
FIG. 19 is a perspective view of an electronic apparatus (personal computer) according to an application of the present invention.

FIG. 19 is a perspective view of a mobile personal computer including the display device 100. The personal computer, indicated at 2000, includes the display device 100 for displaying various images and a main body 2010 having a power supply switch 2001 and a keyboard 2002.

Figure 20:
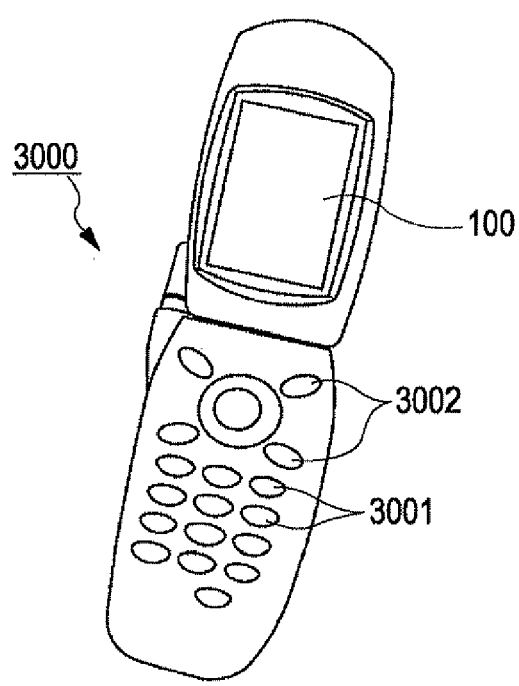
FIG. 20 is a perspective view of an electronic apparatus (mobile phone) according to another application of the present invention.

FIG. 20 is a perspective view of a mobile phone including the display device 100. The mobile phone, indicated at 3000, includes a plurality of operation buttons 3001, scroll buttons 3002, and the display device 100 for displaying various images. Any of the scroll buttons 3002 is operated to scroll up or down a screen displayed on the display device 100.

Figure 21:
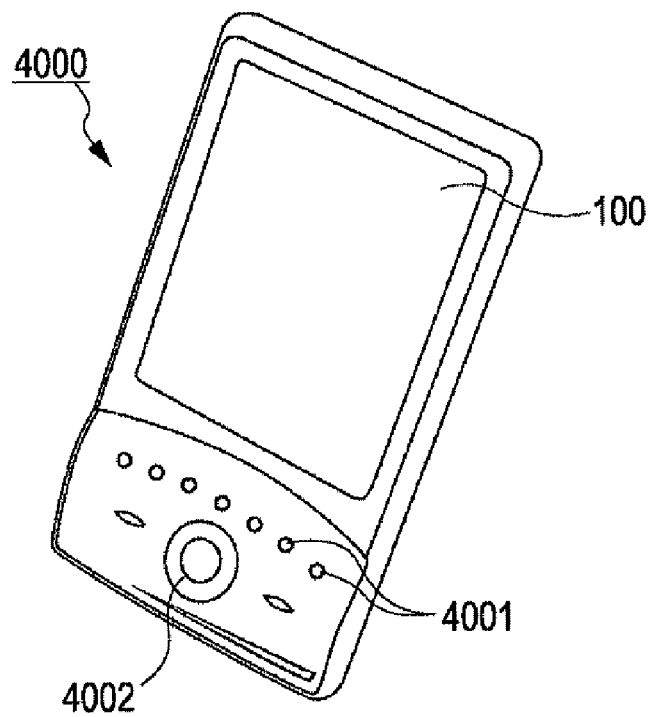
FIG. 21 is a perspective view of an electronic apparatus (personal digital assistant) according to another application of the present invention.

FIG. 21 is a perspective view of a personal digital assistant (PDA) including the display device 100. The PDA, indicated at 4000, includes a plurality of operation buttons 4001, a power supply switch 4002, and the display device 100 for displaying various images. The power supply switch 4002 is operated to display various pieces of information, such as an address list or a schedule book, on the display device 100.

Figure 22:
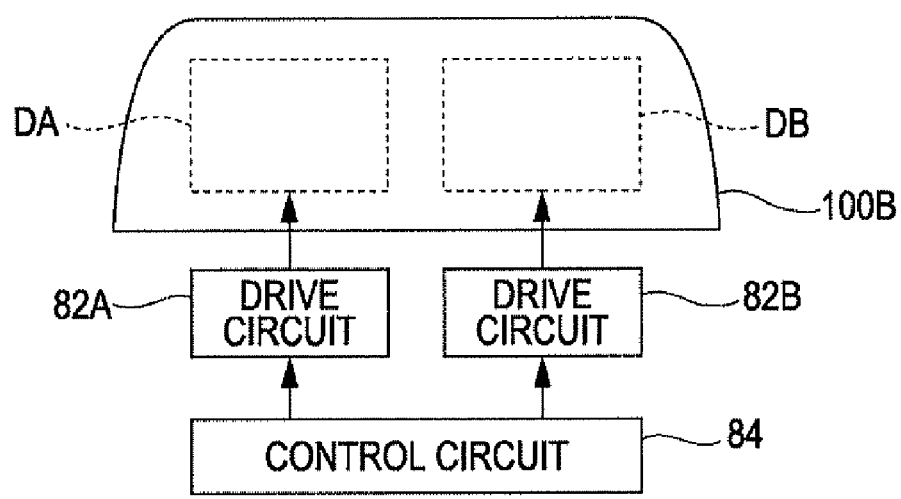
FIG. 22 is a block diagram illustrating an electronic apparatus (on-vehicle instrument panel) according to another application of the present invention.

FIG. 22 is a conceptual diagram showing a case where the display device 100B according to the second embodiment is applied to an on-vehicle instrument panel. Referring to FIG. 22, the instrument panel includes the display device 100B in which the first display DA and the second display DB are arranged horizontally, drive circuits 82A and 82B, and a control circuit 84. The drive circuit 82A displays an image designated by the control circuit 84 on the first display DA. The drive circuit 82B displays an image designated by the control circuit 84 on the second display DB. The control circuit 84 allows the first display DA to display, for example, vehicle speed and allows the second display DB to display, for example, a map generated by a navigation system (not shown) in order to direct a route to a destination.

The control circuit 84 is connected to a sensor (not shown) for detecting an abnormal condition in the first display DA or the second display DB. For example, a temperature sensor for detecting the temperature of the first display DA and that of the second display DB, an ammeter from detecting current flowing through the luminous layer segment 15 in each pixel P, or a luminance sensor for measuring the luminance of each pixel P may be used. When a detected value obtained by the sensor is above (or below) a predetermined threshold, the control circuit 84 determines that an abnormal condition occurs in the first display DA or the second display DB and performs a predetermined control operation. For instance, when detecting an abnormal condition in the first display DA, the control circuit 84 allows the second display DB to display vehicle speed which has been displayed on the first display DA. In this application, when an abnormal condition is not detected, various images can be displayed using both of the first and second displays DA and DB. If an abnormal condition occurs in any of the first display DA and the second display DB, the destination of desired information which is displayed on one display D with the abnormal condition is changed to the other display D, so that high-priority information (e.g., speed) can be displayed with reliability.

Electronic apparatuses to which the display device according to any of the embodiments of the present invention is applied may include a digital still camera, a television, a video camera, a car navigation system, a pager, an electronic notebook, an electronic paper, an electronic calculator, a word processor, a workstation, a video phone, a POS terminal, a printer, a scanner, a copy machine, a video player, and an apparatus having a touch panel in addition to the electronic apparatuses shown in FIGS. 19 to 22.

The entire disclosure of Japanese Patent Application Nos: 2007-180535, filed Jul. 10, 2007, 2007-180537, filed Jul. 10, 2007 and 2007-273470, filed Oct. 22, 2007 are expressly incorporated by reference herein.

What is claimed is:

1. A display device comprising:
   a display that has a display area and includes an electro-optic layer and a light-reflecting layer reflecting light emitted from the electro-optic layer to a viewing side of the display device, the light-reflecting layer being arranged in the display area;
   a plate-shaped exterior that has a frame area including a portion located outside a periphery of the display; and
   an antireflective plate that continuously covers both of the display area and the frame area, the antireflective plate preventing external light, which enters the viewing side of the display device and is reflected by the light-reflecting layer or the frame area, from emerging on the viewing side.

2. The device according to claim 1, wherein a maximum value of the difference between a reflectance (%) measured by applying measurement light having a predetermined wavelength to the frame area of the exterior through the antireflective plate and that measured by applying measurement light having the same predetermined wavelength to the display area of the display through the antireflective plate is 3% or less when the wavelength of the measurement light ranges from 500 nm to 600 nm.

3. The device according to claim 1, wherein the exterior is a frame-shaped member that has an opening formed so that the display area of the display is located within an inner periphery of the exterior.

4. The device according to claim 3, wherein the display includes a light-shielding layer that shields a region between pixels against light, and an outer periphery of the light-shielding layer is located outside the inner periphery of the exterior.

5. The device according to claim 3, wherein the exterior is joined to a first surface of the display adjacent to the viewing side of the display device, and a first surface of the antireflective plate is joined to a first surface of the exterior adjacent to the viewing side.

6. The device according to claim 5, further comprising:
an antireflection coating layer disposed on at least one of the first surface of the antireflective plate, a second surface of the antireflective plate, and the first surface of the display.

7. The device according to claim 5, further comprising:
a light-transmissive filler disposed in a space between the first surface of the display and a second surface of the antireflective plate facing the display.

8. The device according to claim 5, wherein the exterior is a plate-shaped member disposed on a second surface of the display remote from the viewing side.

9. The device according to claim 5, wherein a second surface of the antireflective plate opposed to the display is covered with a light-shielding characteristic control layer such that the characteristic control layer is partially located outside the display area.

10. An electronic apparatus comprising the display device according to claim 1.

11. A display device comprising:
a plurality of displays each having a display area and including an electro-optic layer and a light-reflecting layer reflecting light emitted from the electro-optic layer to a viewing side of the display device, the light-reflecting layer being arranged in the display area of each display;
a plate-shaped exterior that has a frame area including a portion located outside a periphery of each display; and
an antireflective plate that continuously covers the display areas of the respective displays and the frame area, the antireflective plate preventing external light, which enters the viewing side of the display device and is reflected by the light-reflecting layer of each display or the frame area, from emerging on the viewing side.

12. The device according to claim 11, wherein the displays are spaced apart from each other, and the exterior includes a portion between adjacent displays.

13. The device according to claim 11, wherein a maximum value of the difference between a reflectance (%) measured by applying measurement light having a predetermined wavelength to the frame area of the exterior through the antireflective plate and that measured by applying measurement light having the same predetermined wavelength to the display area of each display through the antireflective plate is 3% or less when the wavelength of the measurement light ranges from 500 nm to 600 nm.

* * * * *